W. H. THIEMER.
UNIVERSAL JOINT.
APPLICATION FILED MAY 16, 1919.

1,371,005.

Patented Mar. 8, 1921.

UNITED STATES PATENT OFFICE.

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,371,005. Specification of Letters Patent. Patented Mar. 8, 1921.

Application filed May 16, 1919. Serial No. 297,547.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

Figure 1:
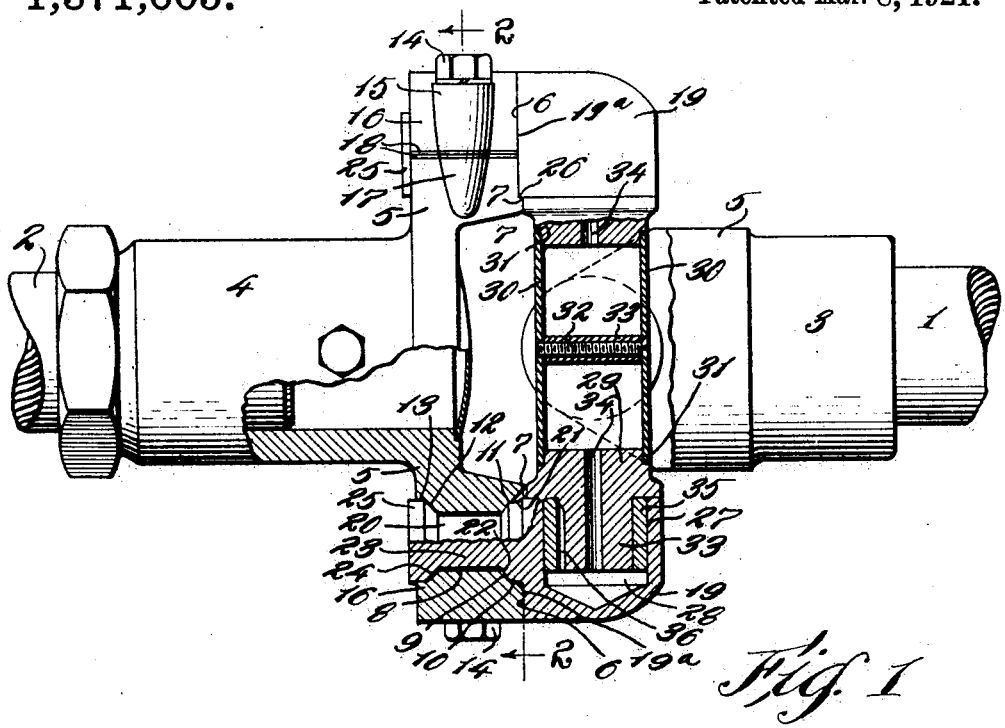
Figure 2:
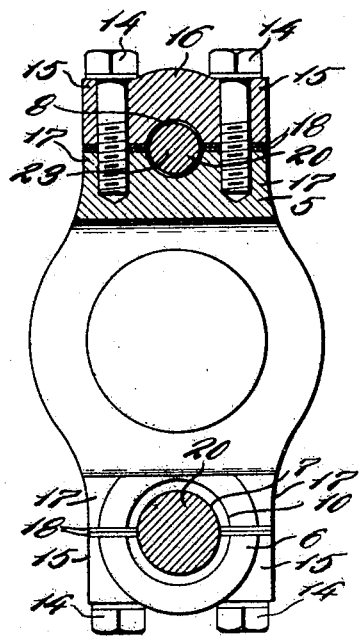

This invention relates to universal joints and has for its object to provide a simple and effective means for connecting the hubs, and particularly the bearing blocks thereof, to the intermediate cross or connecting members. I secure the foregoing object in and through the construction and arrangement of parts illustrated in the drawings forming part hereof, wherein Figure 1 represents a side elevation, with parts broken away, of a universal joint constructed in accordance with my invention, together with the shaft sections united by the said joints; and Fig. 2 a sectional view corresponding to the line 2—2 of Fig. 1.

Describing the various parts illustrated by means of reference characters, 1 and 2 denote shaft sections each having a hub indicated at 3 and 4, respectively, each hub having a base flange 5 forming a support for a pair of bearing blocks each having a bore for the reception of a trunnion of the connecting member. In forming the hubs, each hub and its base flange 5 will preferably be formed by forging the metal to shape, the flanged portion of the base being provided with a seat 6 at each end thereof for the reception of a bearing block and with a transverse shoulder 7 which is adapted to engage a coöperating face on the bearing block to prevent the latter from rotating on the seat 6.

Each seat of each hub flange 5 is provided with a bore for the reception of the stud of a bearing block. This bore comprises a central cylindrical portion 8 merging at its front end with an inclined or frusto-conical surface 9 in front of which is a frusto-conical surface 10 preferably having a greater slope or inclination than the former surface, there being a short ledge 11 between the surfaces 9 and 10. The shoulder 7 is located beyond the surface 10.

At its opposite end. the bore 8 merges with a frusto-conical surface 12 which in turn merges with a cylindrical surface 13 extending to the rear surface of the flange. After the bore has been formed in the manner described, each flange is severed by sawing through the longitudinal center of the bore 8 parallel with the axis of the hub, and the seat sections thus provided are re-united, after the studs of the bearing blocks have been inserted, by means of cap screws 14 extending through lugs 15 formed on the removable sections or members 16 of the base flange and threaded into the other sections of the seat, which may also have lugs 17 adapted to register with the lugs 15 and having internally threaded bores for the reception of said screws. To preserve the contour of the bores 8—13 when the bearing blocks are assembled, one or more shims 18 may be inserted between the proximate faces of the seat sections, the said shims being anchored in place by the screws 14 which extend therethrough.

Coöperating with the seats 6 are the bearing blocks 19. Each block is shown as adapted to receive therewithin a trunnion of the intermediate or connecting member and is so constructed as to enable the bearings for said trunnions to be effectively lubricated from a central well in such connecting member. Each bearing block is shown as provided with a flat face 19$^a$ adapted to fit against the seat 6 and with a stud, indicated generally at 20, adapted to be received within a bore 8—13 provided in its seat. Each stud is provided with a slightly tapered surface 21 adapted to provide a clearance with the surface 10 and with a tapered or beveled surface 22 adapted to seat upon the tapered or frusto-conical surface 9 of the bore when the surface 19$^a$ engages the seat 6; also with a cylindrical surface 23 adapted to fit within the cylindrical portion 8 of the bore and with a head having a tapered or frusto-conical surface 24 adapted to engage the surface 12 of said bore. The outer or rear end of the head is provided with a cylindrical surface 25 adapted to fit within the cylindrical surface 13 of the bore, the parts being so arranged that when the studs are inserted in the portions of the bores carried by the base flanges and the removable portions 16 of the seats are secured in place by the cap screws 14, the setting up of said screws will tend to draw the bearing blocks firmly against their seats 6 by the engagement of the surface 12 of each bore with the surface 24 of the head of its stud.

Each bearing block is provided with a surface 26 adapted to coöperate with a shoulder 7 to prevent rotation of the block upon its seat and each bearing block is shown as provided with a bore 27 extending outwardly from the surface 26 and terminating within the outer surface of the block, to provide a well 28.

The connecting member is shown as of the ring type and is indicated generally at 29. This connecting member is provided with a central well for lubricant, the said well being shown as provided within the interior of the ring by means of plates 30 fitted within seats 31 and connected at their central portions by means of a screw 32 mounted within a spacing sleeve 33. The ring is provided with trunnions 33 each having an axial port 34 communicating at its inner end with the well 29 and at its outer end with a well 28. Each trunnion is shown as mounted within a bushing 35 interposed between the same and the bore 27. In operation, the lubricant from the well 29 will be supplied by centrifugal action from the well 29 through the ports 34 to the wells 28 and thence between each trunnion and its surrounding bushing, as by means of a port 36 formed within the outer surface of the trunnion.

In assembling, one trunnion of each pair may have thereon its bearing block and bushing and the stud may be inserted within the portion of the bore provided therefor in the base section of the seat. The opposite bearing block may then be slipped over its trunnion, with its stud fitted within the portion of the bore provided therefor in the seat section at the opposite side of the base. The removable sections 15 of the seats may then be secured in place; and the setting up of such removable sections will serve to draw the blocks to their seats 6.

Having thus described my invention, what I claim is:—

1. In a universal joint, the combination of a hub having sectional seats for bearing blocks, each seat comprising a removable section and a section rigid with said hub, the two sections having jointly a bore therein for the reception of a stud, bearing blocks adapted to rest upon the seats and each having a stud adapted to enter the bore provided therefor, and means for securing the removable members or sections of the seats to the fixed members, the bores of said seats and the said studs having surfaces coöperating to draw the blocks to their seats by the operation of securing the removable seat sections in place.

2. In a universal joint, the combination of a hub having seats for bearing blocks, each seat comprising a seat member rigid with the hub and a seat member detachably connected to the former member, each pair of members having jointly formed therein a bore for the reception of a stud, the said bore having an inclined surface toward the rear thereof, a bearing block for each seat, said bearing block having a stud adapted to be received within the bore formed between a pair of seat members, the said stud having an inclined surface coöperating with the inclined surface of the bore whereby the securing of the removable seat members to the rigid members will draw the said blocks to their seats, and means for securing the removable seat members to the rigid seat members.

3. In a universal joint, the combination of a hub having a pair of seats, each seat comprising a member rigid with the hub and a member detachably connected thereto, each pair of members having formed jointly therein a bore for the reception of a stud, each bore comprising a central, cylindrical portion merging at its opposite ends with inclined portions, a bearing block for each bore, each bearing block having a stud provided with a cylindrical surface adapted to fit within the cylindrical portion of the bore and with the inclined projections at opposite ends of said cylindrical portion, one of such inclined portions being adapted to be engaged by the inclined portion of the bore thereby to draw the blocks to their seats by the connection of the removable members to the fixed members of said seats, and means for connecting the seat members.

4. In a universal joint, the combination of a hub having seats for bearing blocks, each seat comprising a seat member rigid with the hub and a seat member detachably connected to the former member, each pair of members having jointly formed therein a bore for the reception of a stud, a bearing block for each seat, each bearing block having a stud adapted to be received within the bore formed between a pair of seat members, and a head on said stud having an inclined surface adapted to be engaged by a coöperating inclined surface of its bore, thereby to draw the said blocks to their seats by the operation of securing the removable seat members to the rigid seat members.

5. In a universal joint, the combination of a hub having a pair of seats, each seat comprising a member rigid with the hub and a member detachably connected thereto, each pair of members having formed jointly therein a bore for the reception of a stud, each bore comprising an intermediate portion merging at its opposite ends with oppositely inclined portions, a bearing block for each bore, each bearing block having a stud adapted to be received within the intermediate portion of the bore and having oppositely inclined projections at opposite ends of such intermediate portion, one of such inclined portions being adapted to be engaged by the inclined portion of the bore thereby to draw the blocks to their seats upon the other inclined portion of each bore by the connection of the removable members to the fixed members of said seats, and means for connecting the seat members.

In testimony whereof, I hereunto affix my signature.

WILLIAM H. THIEMER.